United States Patent
Russke et al.

(10) Patent No.: US 7,735,900 B2
(45) Date of Patent: Jun. 15, 2010

(54) CONVERTIBLE

(75) Inventors: Klaus Russke, Bissendorf (DE);
Winfried Bunsmann, Bissendorf (DE);
Matthias Aydt, Eberdingen (DE)

(73) Assignee: Wilhelm Karmann GmbH, Osnabrück (DE)

( * ) Notice: Subject to any disclaimer, the term of this patent is extended or adjusted under 35 U.S.C. 154(b) by 154 days.

(21) Appl. No.: 10/531,681

(22) PCT Filed: Oct. 13, 2003

(86) PCT No.: PCT/DE03/03397

§ 371 (c)(1),
(2), (4) Date: Oct. 24, 2005

(87) PCT Pub. No.: WO2004/037585

PCT Pub. Date: May 6, 2004

(65) Prior Publication Data

US 2006/0131923 A1    Jun. 22, 2006

(30) Foreign Application Priority Data

Oct. 17, 2002  (DE)  ................. 102 48 348
Oct. 17, 2002  (DE)  ................. 102 48 349
Oct. 17, 2002  (DE)  ................. 102 48 350

(51) Int. Cl.
*B60J 7/14* (2006.01)
(52) U.S. Cl. ............. 296/108; 296/107.19; 296/216.01
(58) Field of Classification Search ............ 296/107.07, 296/107.17, 107.2, 108, 216.01
See application file for complete search history.

(56) References Cited

U.S. PATENT DOCUMENTS

| 2,768,025 A | 10/1956 | Spear, Jr. et al. |
| 6,866,324 B2 * | 3/2005 | Neubrand et al. ........... 296/108 |

FOREIGN PATENT DOCUMENTS

| DE | 41 00 677 | 8/1991 |
| DE | 40 38 074 | 10/1991 |
| DE | 44 45 580 | 12/1995 |
| EP | 1 247 676 | 10/2002 |
| WO | 01/62533 | 8/2001 |

* cited by examiner

*Primary Examiner*—Joseph D Pape
(74) *Attorney, Agent, or Firm*—Friedrich Kueffner

(57) ABSTRACT

A convertible includes an automobile body and a movable roof having at least a rear roof part and an upper roof part, wherein the rear roof part extends at least between a belt line and the upper roof part. The upper roof part is located above a passenger compartment and in front of the rear roof part. The rear roof part has a middle section that encloses a rear window and is located between lateral main posts of the automobile body when the roof is closed. The main posts and the middle section are each rotationally connected with the automobile body and with the upper roof part by joints which form a multijoint linkage whose axis of rotation lie in a common plane in at least one movement position of the roof, so that at least one additional support of the upper roof part located in front of the rear roof part is provided for supporting the upper roof part with respect to the automobile body, wherein the additional support is active in the at least one movement position of the roof.

11 Claims, 12 Drawing Sheets

CONVERTIBLE

BACKGROUND OF THE INVENTION

1. Field of the Invention

The invention concerns a convertible and a movable roof for the convertible

2. Description of the Related Art

DE 44 45 580 C1 describes a convertible that has rigid roof parts that can be folded towards each other. A rear roof part comprises two main posts that project laterally upward and a rear window that lies between them. Following the course of the main posts, two parts of a linkage are installed on each side of the vehicle, one so-called link and one main link, which extend between a main bearing situated below the belt line and a front roof part, which, in its closed position, lies essentially horizontally above the passenger compartment. The link and the main link lie essentially parallel to each other in a side view and form parts of an articulated parallelogram, with which the opening and closing movement of the roof parts can be effected.

The main link can also be formed by the main post of the rear roof part itself. However, at least the link lying parallel to this juts out in any case relative to the rear roof part and thus limits the head clearance in the passenger compartment—as is also the case with an upper horizontal link (referred to there as guide element 15), which is arranged below the front roof part and connects the link and the main link with each other to close the parallelogram. Precisely in the case of two-seater vehicles, in which the head of the driver or passenger must be held in the vicinity of the transition between the front and rear roof parts, linkage parts arranged there are especially troublesome and, in the event of an accident, dangerous. Therefore, it is necessary to provide additional lining elements for these linkage parts. These additional lining elements further reduce interior space and, of course, also allow the linkage parts to pass through slot recesses or the like during movement of the roof.

SUMMARY OF THE INVENTION

The invention is based on the problem of creating optimized folding kinematics in a convertible with several rigid roof parts.

The invention solves this problem with a convertible that includes at least two rigid roof parts, wherein a rear roof part extends at least between the belt line and a roof part, which is located above a passenger compartment and in front of the rear roof part, and the rear roof part has a middle section that encloses a rear window and is located between lateral main posts when the roof is closed, characterized by the fact that the main posts, on the one hand, and the middle section, on the other hand, are each separately rotationally connected both with the automobile body and with the upper roof part by joints, which form a multijoint linkage as seen in a side view, and whose axes of rotation lie in a common plane in at least one movement position of the roof, such that at least one additional support of the roof part or a roof part located in front of the rear roof part is provided for supporting the roof part with respect to the automobile body and is active in at least this movement position of the roof.

In accordance with the invention the individual pivot connection of the middle section, which encloses the rear window, on both the automobile body and the upper roof part makes it possible for the middle section that encloses the rear window to act as a pivot link, and therefore the number of additional links can be reduced or, especially advantageously, can be dispensed with entirely. This applies both to links that extend parallel to the main posts and to an upper horizontal connecting piece. This increases head clearance and reduces the risk of injury.

In particular, if both the main posts and the middle section can act as pivot links between the automobile body and the upper roof part, a pair of pivot links is already formed on each side of the vehicle, which makes it possible to realize advantageous roof lowering kinematics, even without additional links. Due to the individual swivelability of the middle section, on the one hand, and of the lateral main posts, on the other hand, the roof lowering movement can be adapted to the space conditions in the automobile body, since in the lowered position, the specified parts can be spaced apart from one another.

In the design in accordance with claim 3, the use of the middle section and the main posts as parts of an articulated parallelogram makes it possible to preserve the simple and unobstructed movement of the roof by means of an articulated parallelogram, and the aforementioned advantages can be realized at the same time.

If the middle section and the main posts are connected with each other by a coupling element that synchronizes their pivoting movements, a tilt-free course of the opening movement is further supported.

It is very advantageous for the rear window to lie above the lateral main posts when the roof is in its opened state, so that the space available for holding luggage below the rear window is increased.

Especially good visibility to the rear can be realized if the middle section consists of a transparent rear window over essentially its entire height.

The outdoor feeling can be further improved, even when the roof is closed, if a panel that acts as a sunroof is assigned to the upper roof part. This panel can be opened by moving it over the rear roof part. It is especially useful for the panel also to be transparent.

BRIEF DESCRIPTION OF THE DRAWING

Other advantages and features of the invention are apparent from specific embodiments of the object of the invention, which are illustrated in the drawings and described below.

FIG. 9 shows the roof kinematics in the closed roof position.

FIG. 10 shows the roof kinematics in the first opening phase, corresponding approximately to the opening position shown in FIG. 5.

FIG. 11 shows the roof kinematics in the opening position, corresponding approximately to the opening position shown in FIG. 6.

FIG. 12 shows the roof kinematics in the completely open position, corresponding to FIG. 7.

DETAILED DESCRIPTION OF THE INVENTION

Figure 1:
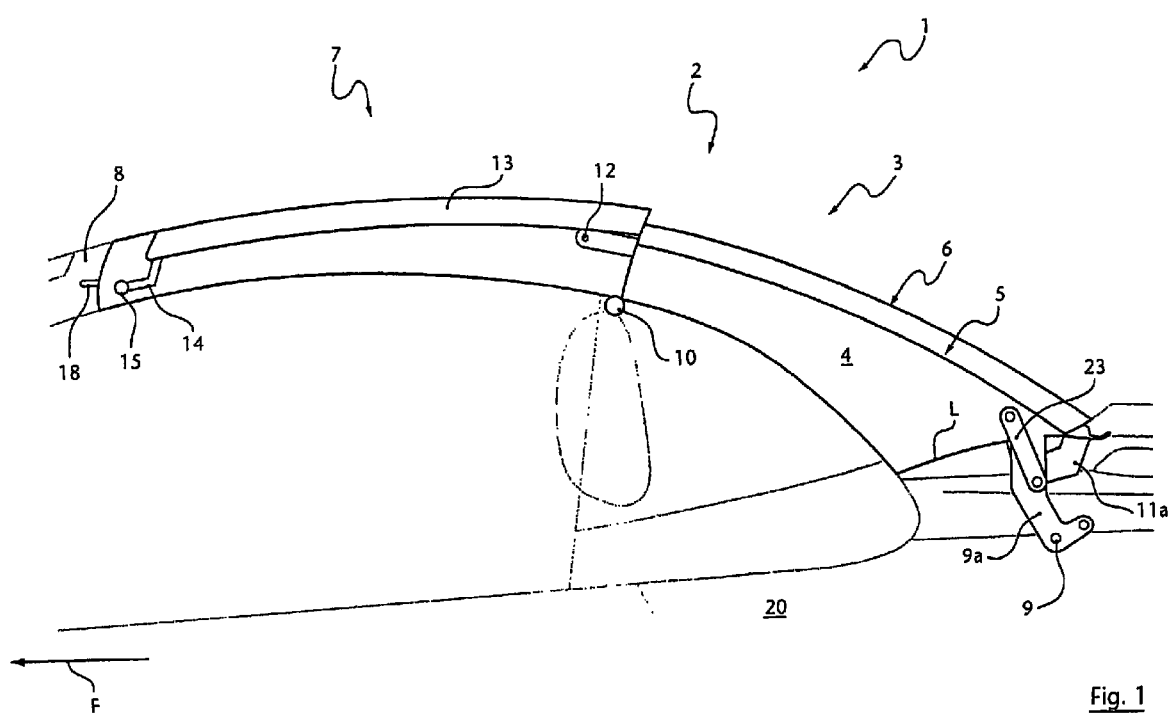
FIG. 1 shows a convertible of the invention in a schematic side view that is broken off below and at the front, with the roof closed and the panel of the upper roof part closed.
Figure 2:
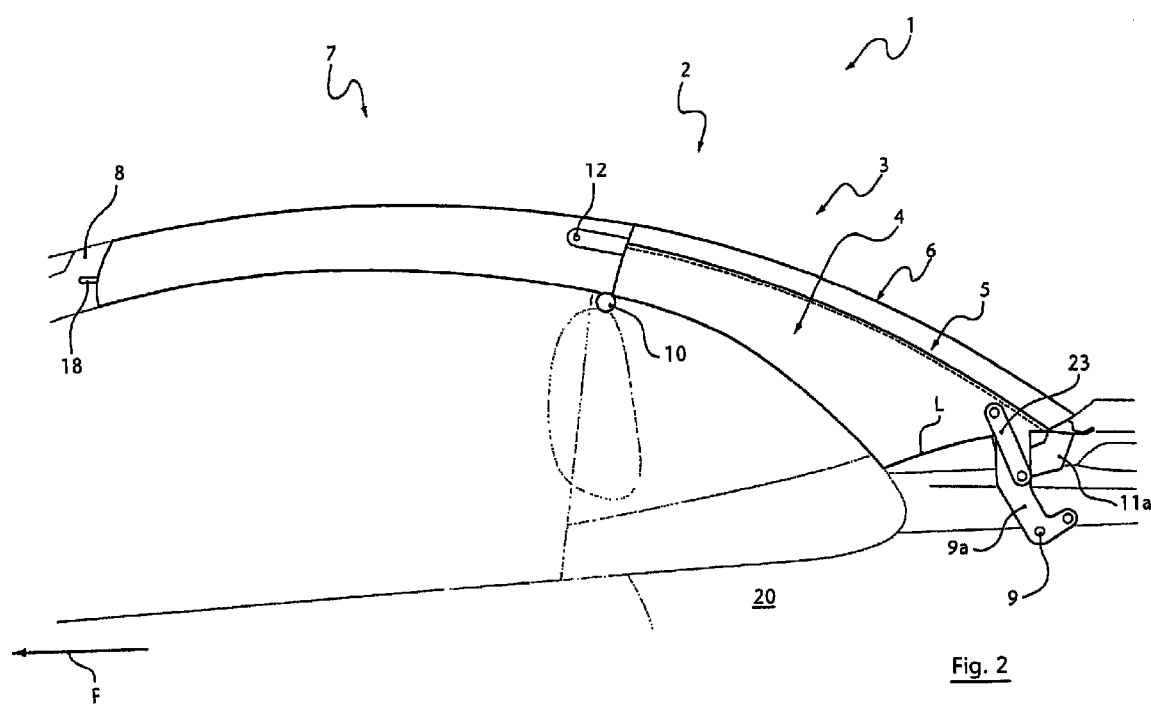
FIG. 2 shows, in a view similar to that of FIG. 1, an alternative design with a single-piece upper roof part without a separate sunroof.
Figure 3:
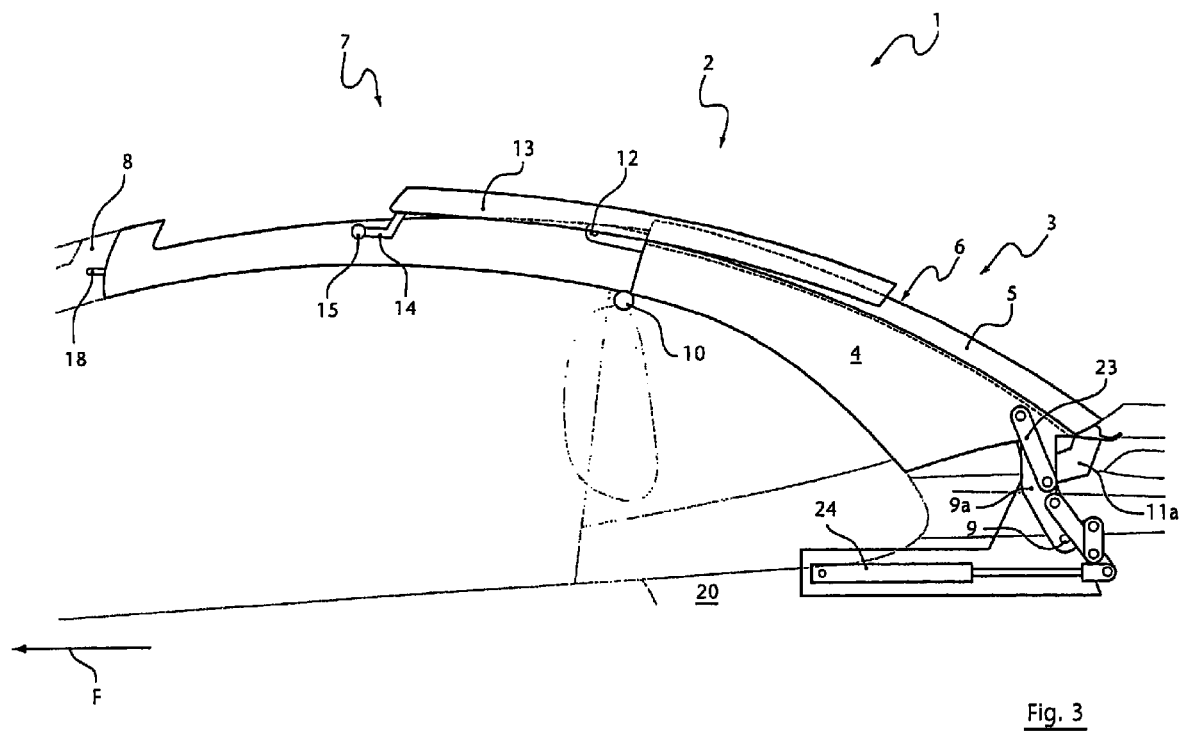
FIG. 3 shows a view similar to that of FIG. 1 during the opening of the panel that acts as a sunroof, which additionally shows the drive and reduction gear train for moving the roof parts.

The illustrated convertible in accordance with the invention is a two-seater. A convertible with, say, two rows of seats one behind the other can also be constructed in accordance with the invention.

The vehicle 1 comprises a movable roof, which is labeled as a whole with 2. The roof 2 comprises a rear roof part 3, i.e., a roof part that is located at the rear relative to the direction of travel F, with two lateral main posts 4 and a middle section 5 located between them. The middle section comprises or is essentially formed by a flexible or, especially, rigid rear window 6, which can be made, for example, of plastic or, advantageously, glass. Both the main posts 4 and the middle section 5 are rigid and therefore can transmit torques. The main posts 4 and a possible frame 5a of the middle section 5 can be made, for example, of steel, a light metal, a metallic foam material, or plastic. It is also possible for the main posts 4 to be transparent. Moreover, the main posts 4 can be supported by frame parts.

In addition, the roof 2 comprises an upper roof part 7, which, in the closed state, is arranged in front of the rear roof part 3 in the direction of travel F of the vehicle. In the illustrated embodiment with a two-seat vehicle 1, this upper roof part 7 is formed by a single panel without further transverse division. In the closed state, it is directly or indirectly supported on the windshield frame 8. Like the main posts 4, the upper roof part 7 can be made of various materials.

The main posts 4 are supported in their lower region by arms 9a relative to the automobile body 20 on pivot bearings 9, which are fixed with respect to the automobile body at least during the swiveling. Their bearing axes run horizontally and transversely to the vehicle 1. In their upper region, the main posts 4 are connected with the upper roof part 7, which is situated above a passenger compartment, on pivot joints 10, which also have horizontal bearing axes that extend transversely to the vehicle 1. When the roof is being opened, the roof parts 3 and 7 fold towards each other about the axis of the pivot joints 10.

The lower region of the middle section 5 is supported by arms 11a relative to the automobile body 20 on one or more pivot bearings 11, which are fixed with respect to the automobile body at least during the swiveling. Their bearing axes run horizontally and transversely to the vehicle 1. In its upper region, the middle section 5 is connected with the upper roof part 7 on at least one pivot joint 12, which likewise has a horizontal bearing axis that extends transversely to the vehicle 1. In the present embodiment, two pivot joints 12 are provided, which are assigned to each side of the vehicle 1.

Figure 13:
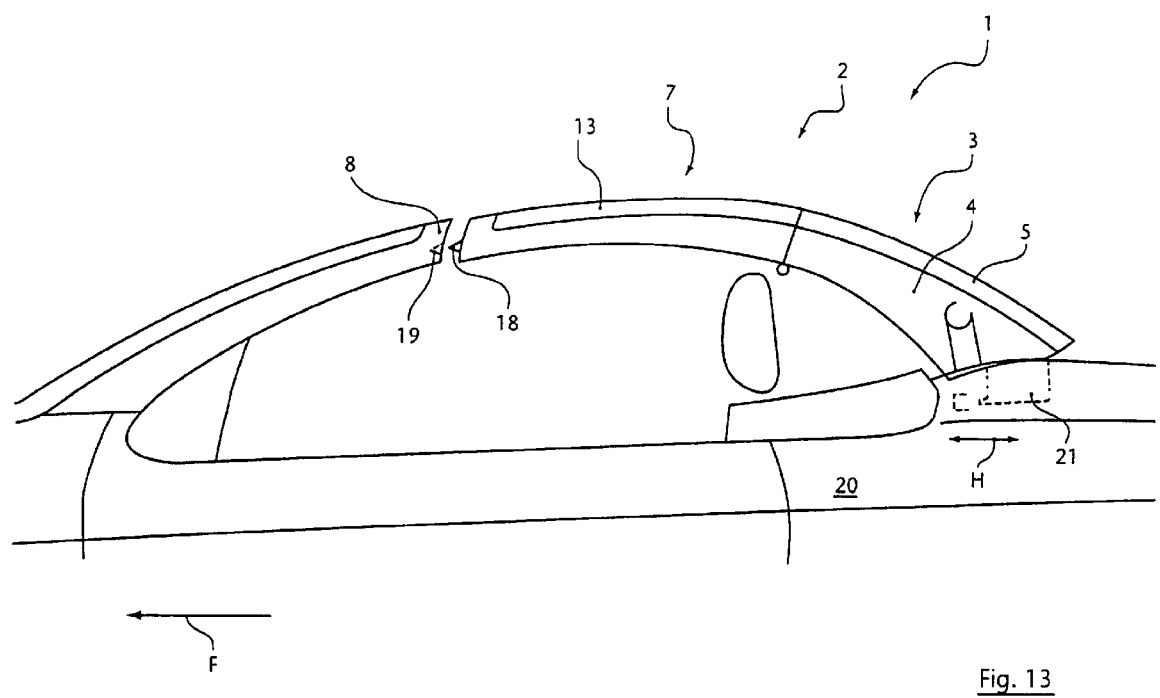
FIG. 13 shows a view similar to that of FIG. 1 with the roof as a whole displaced horizontally to the rear to release the catch between the front end of the roof and the windshield frame.

The pivot joints 11 and 12 of the middle section 5 each lie in planes above the planes of the pivot joints 9 and 10 of the lateral main posts 4. As will be explained in greater detail below, the pivot bearings 9 and 11 can optionally be fixed with respect to the automobile body during the swiveling but can be displaced horizontally or almost horizontally between a closed roof position (FIG. 1) and an extreme rearward position suitable for swiveling (FIG. 13).

As an additional option, in one illustrated embodiment, the front roof part 7 additionally comprises a displaceable panel 13, which can be opened like a sunroof and displaced over the rear roof part 3 (FIGS. 3, 4, 5a, 6, 7, 8). The panel 13 is made of a transparent plastic or glass, so that even when it has been moved over the rear window 6, the view to the rear is not obstructed. It has lateral arms 14, which engage lateral guideways 16 of the upper roof part 7 by means of bearing journals 15 or similar guide elements. In addition, guide rails 17 are provided on the middle section 5 of the rear roof part 3 (FIG. 8), which guide the panel 13 into a position parallel to the rear window 6 and can hold it there. In the closed position, the panel 13 engages both the guideways 16 by means of the arms 14 arranged in the front region and the rear guide rails 17 by means of other arms (not shown). Therefore, the roof 2 cannot be opened until the sunroof 13 has been opened.

Even in the open position of the panel 13 that acts as a sunroof, in which it is displaced to the rear by the maximum amount, the panel 13 is still held in the guide rails 17 of the rear roof part 3 and, by means of its arms 14, in the guideways 16 of the upper roof part 7. The end point of the guideways 16 lies on the pivot axis of the upper pivot joint 12, with which the middle section 5 engages the upper roof part 7, which makes it possible for the roof 2 to be opened and closed with the sunroof 13 open (see, e.g., FIG. 5a). A program control can be provided, which ensures that the roof 2 can be opened or closed only with the sunroof 13 completely open. Due to the fact that the sunroof 13 remains with both its front arms and its rear arms in the respective guides 16, 17, it is not necessary to overcome any step during the opening of the sunroof 13. Therefore, the opening operation can be carried out especially smoothly and reliably, even after an extended vehicle life.

Alternatively, it would also be possible for the panel 13 to be held in its closed state only on the upper roof part 7 and in its open state to be transferred completely to the rear roof part 3. It would then be possible to open the roof with the sunroof 13 either completely open or completely closed.

In the illustrated embodiment, the middle section 5 consists of a support frame 5a and a transparent panel mounted on it, which serves as the rear window 6. This panel can possibly support the guide rails 17 for the sunroof 13. Many other designs are also possible, possibly also with a frame, in the middle of which the rear window is situated, or with arms 11a welded directly onto a rear window.

To secure the front roof part 7 on the windshield frame 8, pins 18 are assigned to the roof part 7, which are located approximately in its extension plane and are directed in travel direction F in the closed state of the roof. The pins 18 fit into complementary recesses 19 of the windshield frame 8. The pins 18 and the recesses 19 can be conically shaped to facilitate centering of the closing roof 2. An additional securing mechanism is not absolutely necessary if a securing mechanism of the displaceable main bearing 21 explained in the next paragraph is provided.

In the aforementioned optional design, the pivot bearings 9, 11 for the parts 4, 5 are fixed with respect to the automobile body and are mounted as a whole in a lateral main bearing 21, which can be displaced relative to the automobile body 20 horizontally or almost horizontally in the longitudinal direction of the vehicle. A drive mechanism 22, say, a hydraulic cylinder, a shaft, an electric motor or the like, is assigned to each of these main bearings 21. Each of the main bearings 21—and thus the roof 2 supported on them—can be moved by this drive mechanism 22 horizontally in the direction of arrow H (transition from FIG. 1 to FIG. 13) between a front extreme position with the roof completely closed and a rear extreme position (FIG. 13), in which the roof 2 has been displaced in the direction opposite the direction of travel F to such an extent that the pins 18 have come out of the recesses 19 of the windshield frame 8. In this position, the roof 2 can swivel freely about the bearings 21 without there being any danger of the tip of the roof colliding with the windshield frame 8.

The distance between the front and rear extreme positions of the drive mechanism 24 is limited to a few centimeters by a possibly adjustable rear stop in such a way that in the rear extreme position of the roof 2, the pins 18 are pulled out of the windshield frame 8 just far enough to allow swiveling to occur. Displacement too far to the rear, on the other hand, would unnecessarily delay the opening or closing operation.

The roof parts 3, 7 are coupled with each other by a coupling element 23 for their movement about the main bearings 21, which are mounted laterally in the automobile body 20. The coupling element 23 extends between arms 9a and 11a, which connect the pivot bearing 9 with a main post 4 and the pivot bearing 11 with the middle section 5. Therefore, one drive 24 for each side of the vehicle (FIG. 3) is sufficient for producing a uniform swiveling movement about the bearings 9 and 11.

Figure 4:
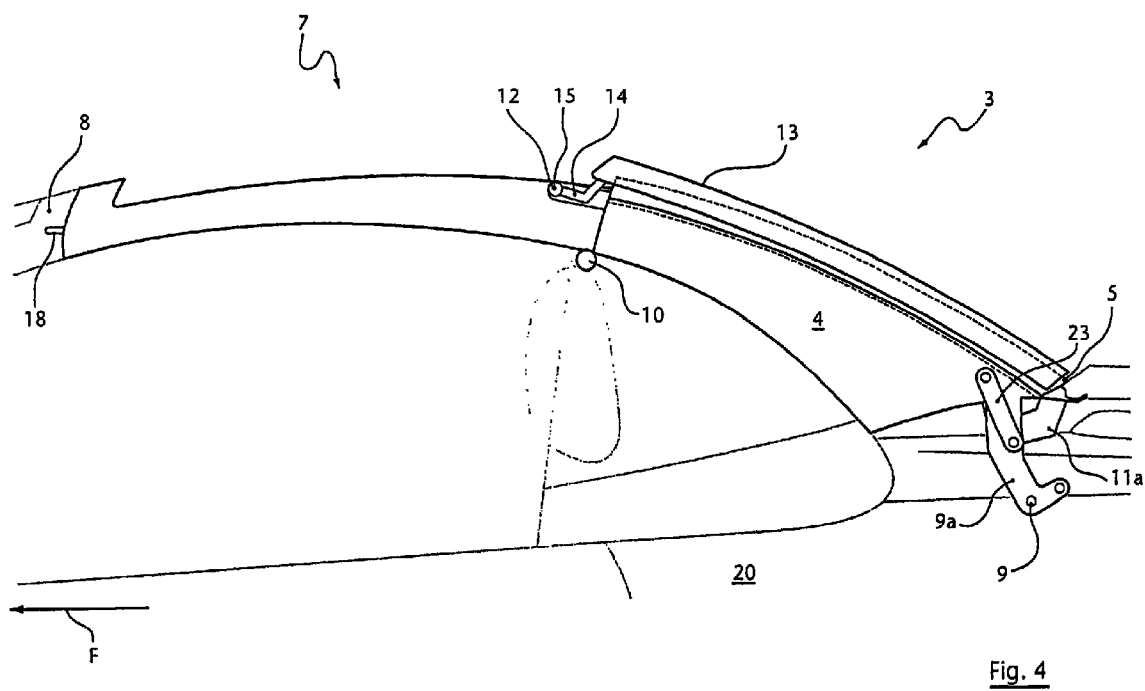
FIG. 4 shows a view similar to that of FIG. 3 with the panel it its completely opened position and with the roof otherwise closed.
Figure 5:
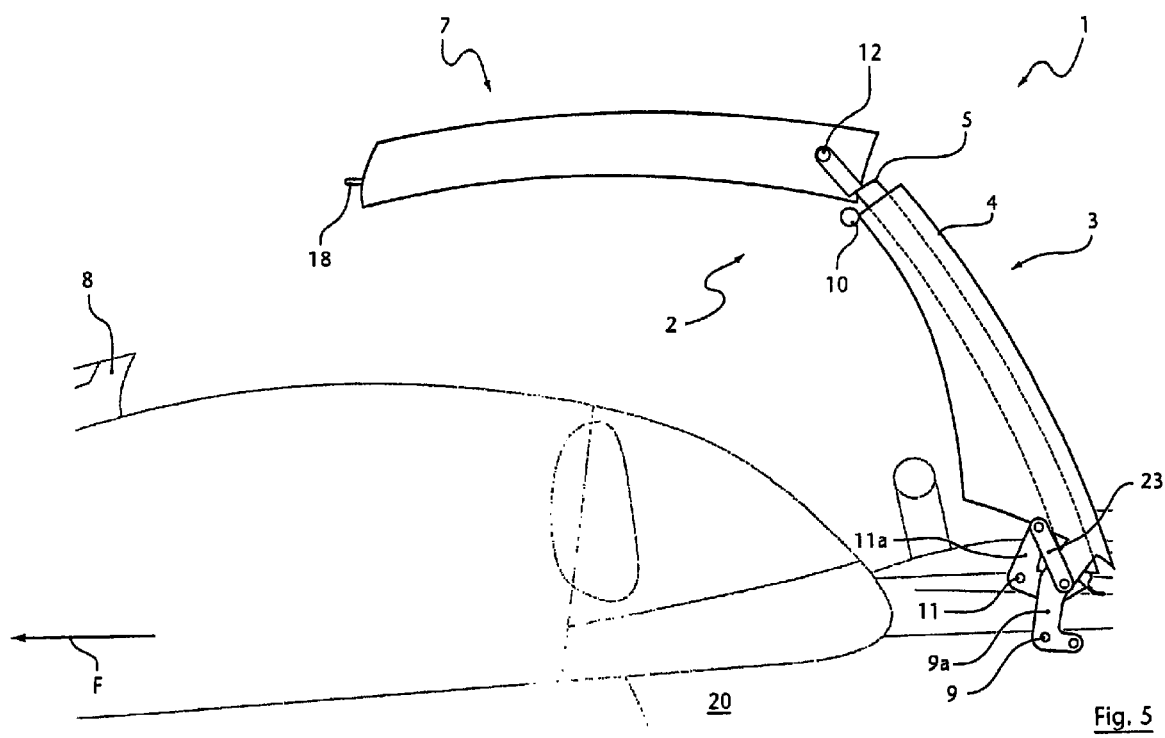
FIG. 5 shows the roof in the embodiment according to FIG. 2, in which there is no sunroof, during the opening of the roof.
Figure 5A:
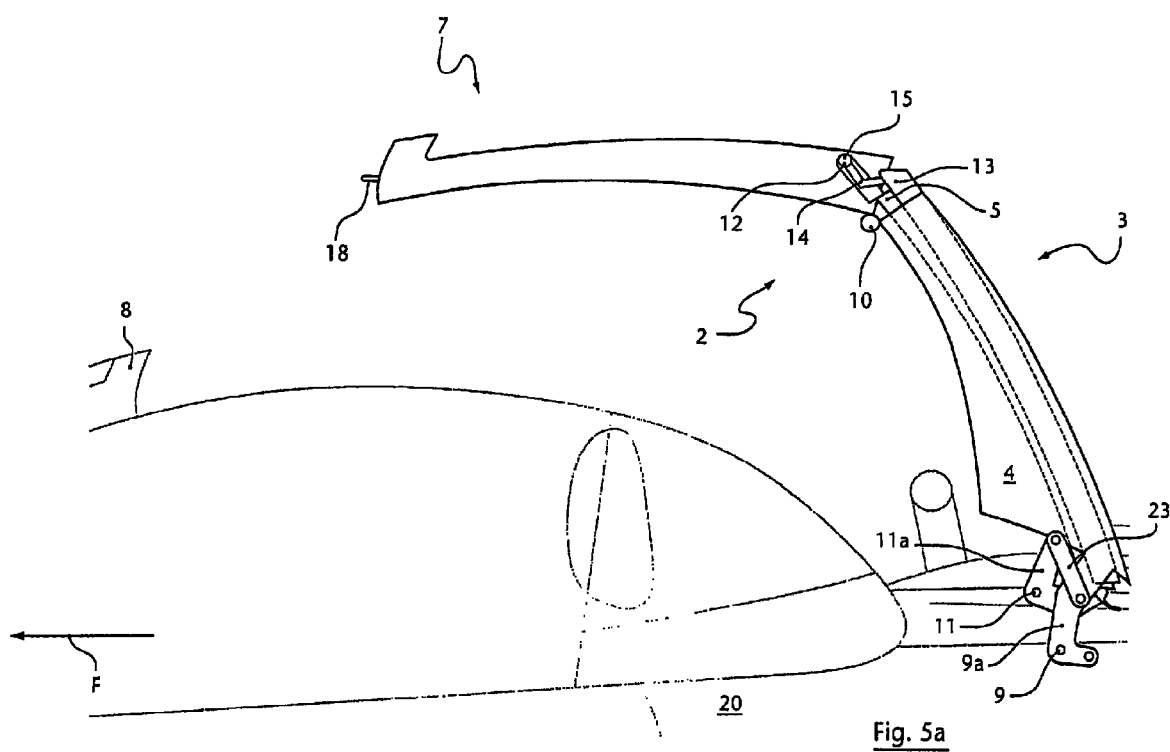
FIG. 5*a* shows, in a view similar to that of FIG. 5, the embodiment with the sunroof, with the sunroof in its open position.
Figure 6:
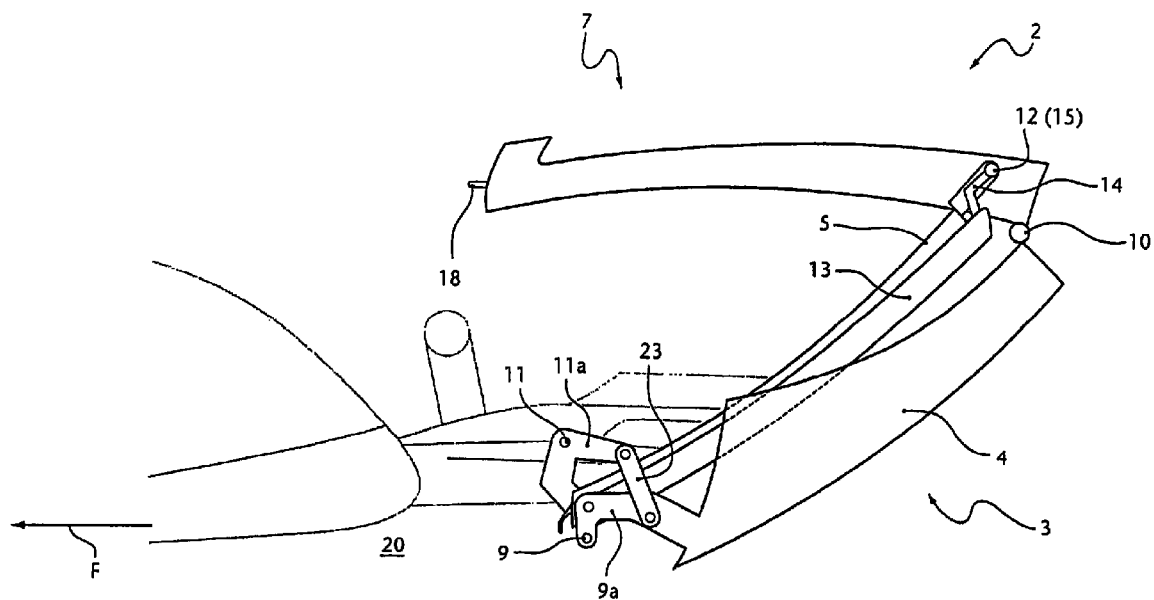
FIG. 6 shows a view similar to that of FIG. 5*a* with further progression of the opening of the roof.
Figure 7:
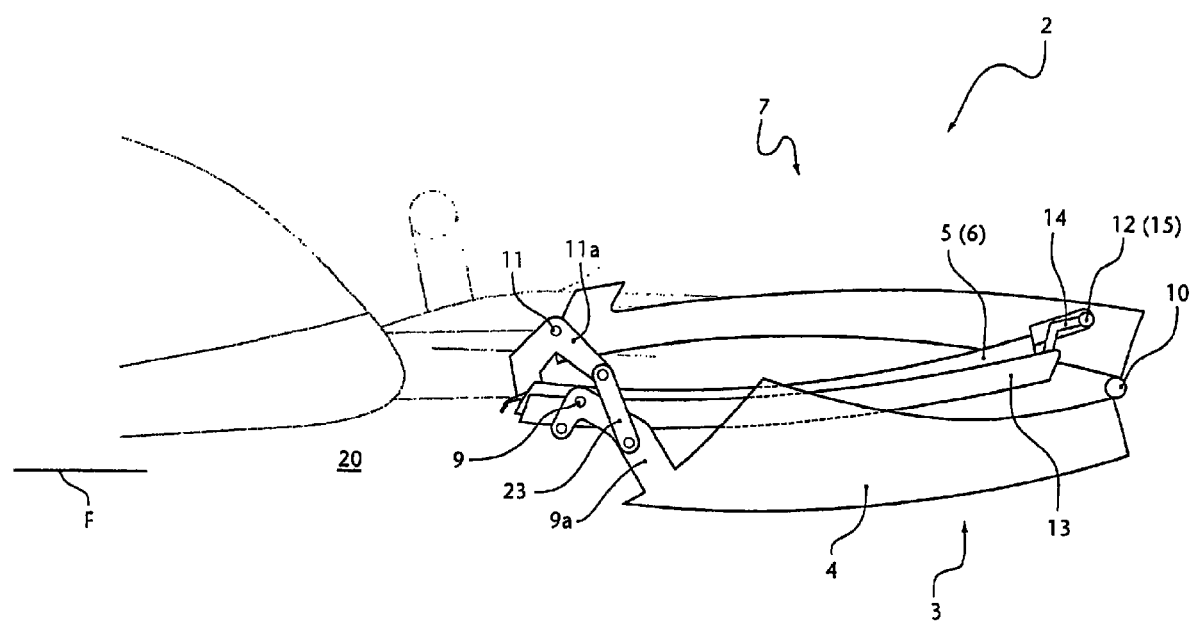
FIG. 7 shows the roof of FIG. 6 in its completely opened position, in which it is lowered into the rear end of the vehicle.
Figure 8:
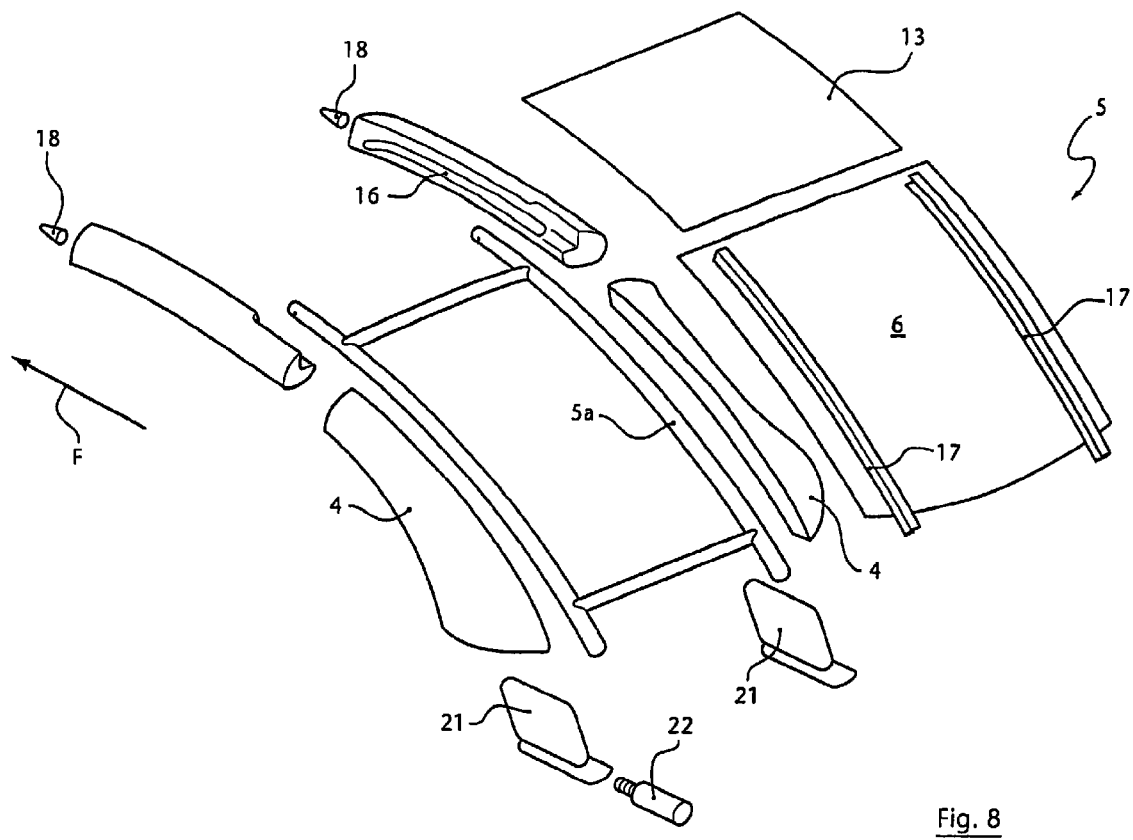
FIG. 8 shows a perspective exploded view of the roof with the plate section provided in the upper roof part.
Figure 9:
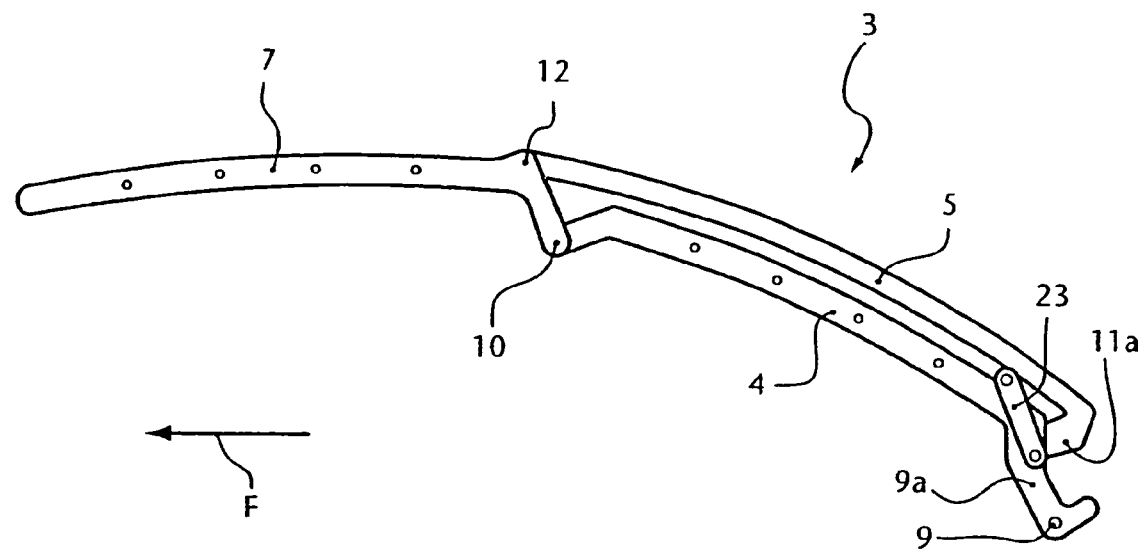
FIGS. 9 to 12 show a simplified systematic side view of the moving parts critical to the lowering of the roof without consideration of drives, gears or a sunroof.
Figure 10:
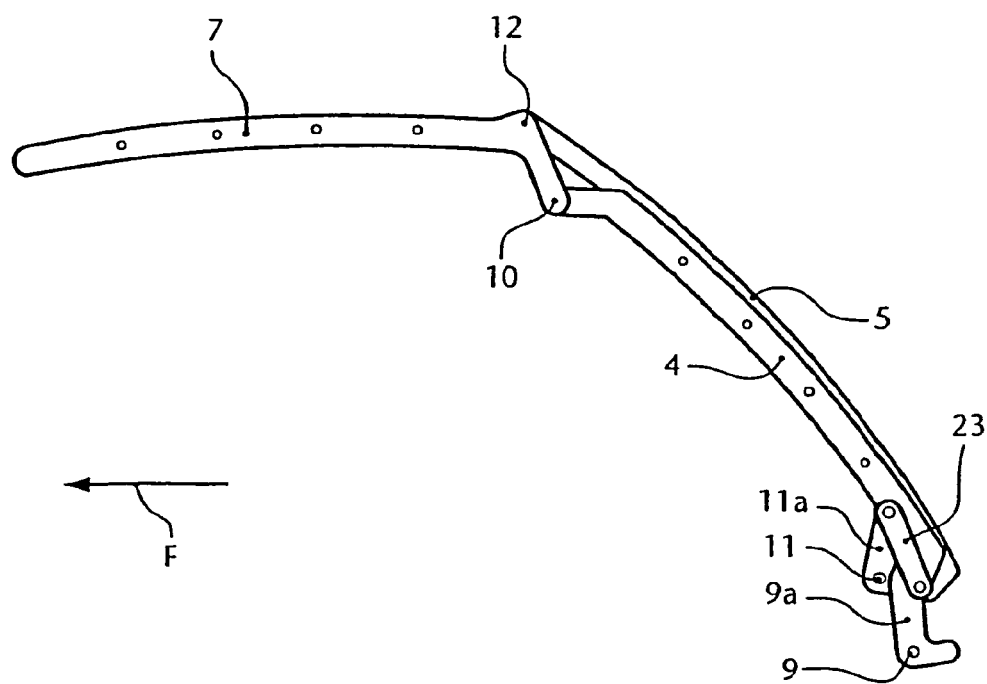
Figure 11:
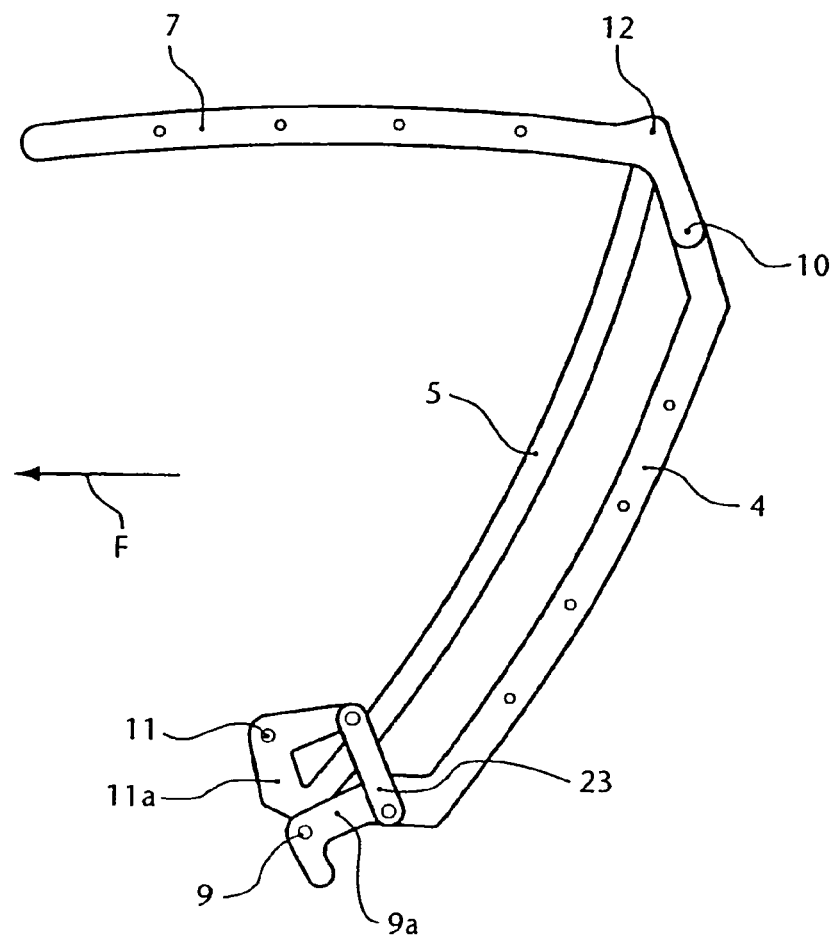
Figure 12:
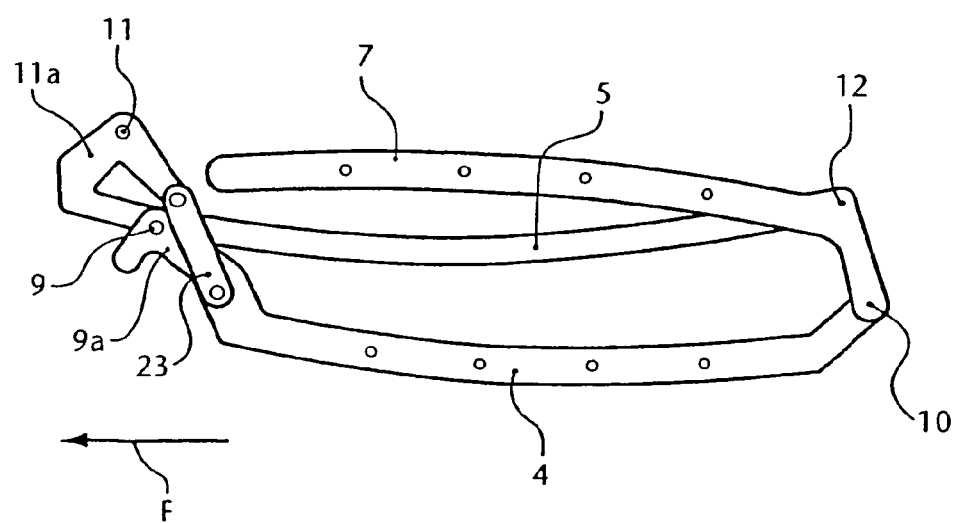

To open the roof 2 from the closed position (FIG. 1 for a version with a sunroof or FIG. 2 for a vehicle without a sunroof) to a completely open position (FIG. 7)—without the option of the roof 2 that can be moved as a whole—the arms 9a and 11a are first simultaneously swiveled by the force of the drive 24 (FIG. 3) towards the rear about the bearings 9, 11, which are fixed with respect to the automobile body (FIG. 5 to FIG. 7, with FIG. 5 showing a roof 2 without a sunroof 13). In the version with a sunroof, the sunroof 13 must be completely open during the opening of the roof 2. In the example shown here, before the operation of opening the roof is started, the sunroof 13 is first opened by guiding the arms 14 in the guideways 16 and further guiding the panel 13 in the guide rails 17 of the rear roof part 3 in such a way that in the completely open position of the sunroof, the bearing journals 15 are coaxial with the pivot axis of the pivot joint 12 (FIG. 4, ff.). In this process, the bearing journals 15 continue to be held in the guideways 16, so that they do not have to overcome either a step or a misalignment as the sunroof 13 is slid open. Since the middle section 5 and the roof part 7 swivel towards each other on the joint 12, during this swiveling, the panel 13 can be held motionless parallel to the rear window 6, which is part of the middle section 5, and yet remain with the arms 14 in the guideways 16 of the front roof part 7.

During the swiveling open of the roof parts 3 and 7, the middle section 5 passes through the extension plane of the main posts 4 due to the height shift of the planes of the joints 9 and 10, on the one hand, and 11 and 12, on the other hand. The long sides of the articulated parallelogram, formed by the main posts 4 and the middle section 5, completely fold towards each other, so that at the end, the parallelogram orientation has changed. In this way, the middle section 5 arrives in a lowered position in the automobile body 20 above the main posts 4 (FIG. 7). This is very advantageous, because it results in additional storage space under the middle section 5 with the rear window 6.

With the option of a horizontal displacement of the whole roof 2, the roof 2 would first be moved towards the rear (FIG. 13) before the movement to swivel it open is initiated and can then be moved back towards the front after the roof has been completely opened.

The complete folding of the parallelogram is brought out again in the schematic overview in FIGS. 9 to 12. The essentially rod-shaped parts shown in this series of drawings were provided with the reference numbers 4, 5 and 7 for the corresponding overall parts for the purpose of simplification, since, where the sequence of movements is concerned, it does not matter how any of the supporting frame parts for the specified units 4, 5, 7 are designed. The sunroof 13 also plays no role in the basic sequence of movements illustrated here. As the drawings show, additional links beyond parts 4 and 5 are not necessary. The parallelogram is closed by the roof part 7 that connects the pivot joints 10 and 12 without there being any need for a separate part here. The head clearance thus remains unrestricted. With the complete swiveling of the parallelogram, one achieves, on the one hand, a sealed contact between the middle section 5 and the main posts 4 with the roof 2 closed and, on the other hand, mounting of the middle section 5 in an elevated plane to increase the trunk space.

The invention can be used both in vehicles with manually moved roofs and in vehicles with fully automatically or semi-automatically moved roofs 2. It is also possible to provide drives only for the horizontal movement H and to carry out the actual folding or unfolding of the roof 2 manually.

The invention claimed is:

1. A convertible (1) comprising an automobile body and a roof with a rear roof part (3), which extends at least between a belt line (L) and a an upper roof part (7) located above a passenger compartment and which comprises a middle roof section (5) that encloses a rear window (6), the middle section (5) being located between lateral main posts (4) of the automobile body when the roof is closed, wherein the middle roof section (5) rotationally connected with both the automobile body (20) and the upper roof part (7), and wherein the roof (2) does not have a guide rod in front of the main posts (4).

2. A convertible (1) in accordance with claim 1, wherein the main posts (4), and the middle section (5) are each rotationally connected both with the automobile body (20) and with the upper roof part (7).

3. A convertible (1) comprising an automobile body and a roof with a rear roof part (3), which extends at least between a belt line (L) and an upper roof part (7) located above a passenger compartment and which comprises a middle roof section (5) that encloses a rear window (6) the middle section (5) being located between lateral main posts (4) of the automobile body when the roof is closed, wherein the roof (2) can be moved by means of an articulated parallelogram attached to the rear roof part (3) wherein the main posts (4) and the middle section (5), form parts of the articulated parallelogram.

4. Convertible in accordance with claim 1, wherein the roof (2) comprises exactly one upper roof part (7) which is rigid.

5. Convertible in accordance with claim 1, wherein the middle section (5) and the main posts (4) are connected with each other by a coupling element (23) that synchronizes their pivoting movements.

6. Convertible in accordance with claim 5, wherein the articulation (11) of the middle section (5) on the automobile body (20) and the articulation (12) of the middle section (5) on the upper roof part (7) are each situated above planes of articulating (9; 10) to the main post (4).

7. Convertible in accordance with claim 6, wherein in an open state, the rear window (6) is held above the main posts (4).

8. Convertible in accordance with claim 1, wherein the middle section (5) is formed as a rear window (6) essentially over its entire height.

9. A convertible (1) comprising an automobile body and a roof with a rear roof part (3), which extends at least between a belt line (L) and a an upper roof part (7) located above a passenger compartment and which comprises a middle roof section (5) that encloses a rear window (6), the middle section (5) being located between lateral main posts (4) of the automobile body when the roof is closed, wherein the middle roof section (5) rotationally connected with both the automobile body (20) and the upper roof part (7), and wherein the roof (2) does not have a guide rod in front of the main posts (4), further comprising a panel (13), wherein the upper roof part (7) has lateral guides (16; 17), wherein the panel (13) is supported in the lateral guides in such a way that the panel can be moved longitudinally.

10. Convertible in accordance with claim 9, wherein the rear roof part (3) has additional lateral guides (17) for the panel (13), which follow the guides (16) of the upper roof part (7), and wherein the panel (13) engages both the lateral guides (16) of the front roof part (16) and the additional guides (17) of the rear roof part (3).

11. Convertible in accordance with claim 1, wherein the roof (2) can be moved essentially horizontally between a closed position, in which the upper roof part (7) is supported indirectly or directly on a windshield frame (8), and an intermediate position, in which the mounting connection between the roof (2) and a windshield frame (8) is released.

* * * * *